United States Patent [19]

Beach

[11] Patent Number: 5,421,484
[45] Date of Patent: Jun. 6, 1995

[54] FROZEN DESSERT DISPENSING APPARATUS

[75] Inventor: William A. Beach, Floyds Knobs, Ind.

[73] Assignee: Polar Express International, Inc., New Albany, Ky.

[21] Appl. No.: 88,900

[22] Filed: Jul. 7, 1993

[51] Int. Cl.⁶ .............................................. B65D 35/30
[52] U.S. Cl. ....................................... 222/95; 222/96; 222/105; 222/146.6
[58] Field of Search ................ 222/95, 96, 105, 146.6, 222/387, 509

[56] References Cited

U.S. PATENT DOCUMENTS

| | | | |
|---|---|---|---|
| 1,996,792 | 4/1935 | Bystricky | 221/47.3 |
| 3,081,920 | 3/1963 | Gorychka et al. | 222/509 |
| 3,371,822 | 7/1968 | Galloway | 222/95 |
| 3,677,443 | 7/1972 | Smadar | 222/94 |
| 4,022,031 | 5/1977 | Calim | 62/66 |
| 4,077,544 | 3/1978 | Malacheski et al. | 222/95 |
| 4,213,545 | 7/1980 | Thompson et al. | 222/386.5 |
| 4,231,492 | 11/1980 | Rios | 222/1 |
| 4,452,823 | 6/1984 | Connolly et al. | 426/115 |
| 4,484,697 | 11/1984 | Fry | 222/95 |
| 4,711,373 | 12/1987 | Christine | 222/82 |
| 4,711,376 | 12/1987 | Manfroni | 222/509 |
| 5,048,724 | 9/1991 | Thomas | 222/95 |
| 5,069,364 | 12/1991 | McGill | 222/95 |
| 5,114,045 | 5/1992 | Herpe | 222/105 |
| 5,161,715 | 11/1992 | Giannuzzi | 222/105 X |

FOREIGN PATENT DOCUMENTS

| | | | |
|---|---|---|---|
| 0246052 | 11/1987 | European Pat. Off. | B67D 1/00 |
| 3618634 | 6/1986 | Germany | B67D 1/00 |
| 2230057 | 10/1990 | United Kingdom | 222/95 |
| 2234556 | 2/1991 | United Kingdom | 222/95 |

Primary Examiner—Karen B. Merritt
Assistant Examiner—Kenneth Bomberg
Attorney, Agent, or Firm—Dorr, Carson, Sloan & Peterson

[57] ABSTRACT

An apparatus is provided for dispensing frozen confections, such as ice cream and yogurts. A collapsible container is adapted to contain the frozen confection and is provided with an outlet of sufficient size to permit extrusion of frozen confection into an outlet dispensing conduit. A compressive force that may be applied by a piston causes the extrusion of frozen confection from the collapsible container into the outlet conduit. A receptacle is provided for the collapsible container wherein the receptacle is so designed that upon collapsing the collapsible container the collapsible container does not collapse into or otherwise plug or interfere with the flow of soft confection through the collapsible container outlet.

2 Claims, 5 Drawing Sheets

FROZEN DESSERT DISPENSING APPARATUS

BACKGROUND OF INVENTION

This invention relates to an apparatus for dispensing food products such as ice creams, yogurts, sherberts and other frozen or semi-frozen dessert confections. This invention also relates to an apparatus for dispensing food products from collapsible containers.

Soft serve frozen and semi-frozen confections are widely used in the food industry and have a broad customer appeal. Although ice creams are the most widely known product dispensed in a soft serve form, an expanding market based on alternative frozen and semi-frozen confections, such as yogurts, also exists. The most common means of dispensing soft serve confections is by extrusion into an edible cone or other suitable container, and the confection is generally intended for immediate consumption.

It is well known that soft serve confectionary products can be easily extruded from dispensing apparatuses to a variety of patterns or shapes. The most common means of dispensing a frozen confection has been the extruding of a continuous ribbon or rod that can be coiled on itself to form a cone having a beehive-type shape. Moreover, the soft serve confectionary products ideally have sufficient strength to retain the extruded shape for a sufficient time to allow for consumer consumption. U.S. Pat. No. 5,048,724 teaches an apparatus for dispensing soft serve frozen confections such as ice cream and yogurts utilizing a collapsible container that contains the frozen confection therein. The collapsible container includes an outlet of sufficient size to permit extrusion of frozen confection therefrom upon collapsing the container. However, one of the principal drawbacks in the use of the apparatus as taught in the U.S. Pat. No. 5,048,724 is that when the collapsible container is mounted in a vertical position for dispensing from the side at the top of the container, upon collapsing of the container from the bottom up, the collapsible container has a tendency to collapse into the outlet as the container gets near empty thereby preventing the flow of confectionary therefrom.

SUMMARY OF THE INVENTION

It is accordingly an object of the present invention to provide a frozen dessert dispenser capable of extruding a frozen or semi-frozen confection from a collapsible container.

Another object of the invention is to provide a device for dispensing confections or desserts that eliminates the problem of the collapsible container collapsing into its dispensing outlet during use.

It is a further object of the present invention to provide a device for dispensing confections or desserts that is sanitary, mechanically simple, easy to clean and easy to use.

More particularly, the present invention provides a frozen confection dispensing apparatus comprising a housing having an interior therein including means to maintain the interior at a preselected temperature; at least one receptacle disposed within the housing for receiving a collapsible container therein, the receptacle having a first opening at one end and a second opening at the opposite end, said first opening being sized to receive said collapsible container therein, said receptacle including means to prevent said collapsible container from collapsing into said first opening during use; said collapsible container including a soft serve frozen confection therein, said collapsible container having an outlet of sufficient size to allow extrusion of said soft serve confection therefrom; and, means to collapse said collapsible container.

Other features and advantages of the present invention will become more apparent from the following description taken in conjunction with the accompanying drawings, which illustrate, by way of example, the principals in the invention.

BRIEF DESCRIPTION OF THE DRAWINGS

For a better understanding of the nature and objects of the present invention, reference should be made to the following detailed description and the accompanying drawings, in which.

DETAILED DESCRIPTION OF THE PREFERRED EMBODIMENT

Figure 1:
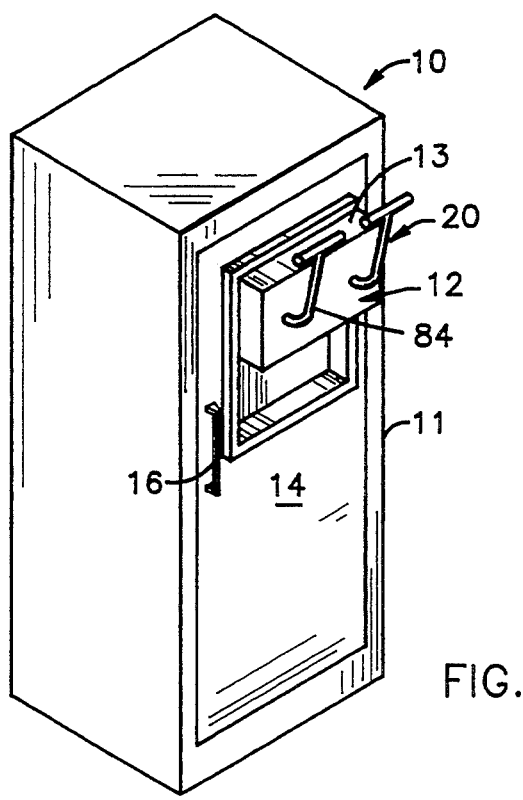
FIG. 1 shows an exterior view of the frozen confection dispensing apparatus according to the present invention.

FIG. 1 shows a frozen confection dispensing apparatus 10 of the present invention with an outer casing 11. A dispensing section 12 having a conduit casing 13 extends through a container door 14 of the apparatus 10. Extending outward from the conduit casing 13 are two valves 20 operably responsive to valve handles 84. Even though two dispensing valves 20 are shown, it is realized that the dispensing apparatus 10 of the present invention may include one or a number of dispensing valves 20 depending on the design of the unit. The dispensing valves 20 are linearly aligned at each interval across the conduit casing 13. Each dispensing valve 20 (FIG. 3A) is disposed for controlling the flow of product from each collapsible container 22. The valve 20 excepting its handle 84 is disposed within the dispensing section 12 so that the valve 20 is in the refrigerated portion of the apparatus, thereby maintaining any frozen dessert therein in a frozen or near-frozen condition at all times prior to dispensing. Access to the interior of the apparatus 10 is aided by the use of a door handle 16.

The outer casing 11 of the apparatus 10 is ideally insulated to reduce heat transfer from the exterior environment to the interior of the apparatus 10. The interior temperature of the apparatus 10 should ideally be maintained within a preselected temperature range generally sufficient to keep frozen confection in a condition that it can be easily extruded from the collapsible bag or container. The preselected temperature will generally be in the range of from 10° F. to about 12° F., but may be lower or higher depending on the physical properties of the frozen dessert being dispensed. When the outer casing 11 is properly insulated, only a small freezing unit is needed to adequately compensate for heat gained from the exterior environment acquired from the outer casing 11 and the opening of the container door 14. Moreover, appropriate refrigeration means, which are well known in the art, are in use within the interior of the dispensing apparatus 10 to maintain the temperature in the preselected range.

Figure 2:
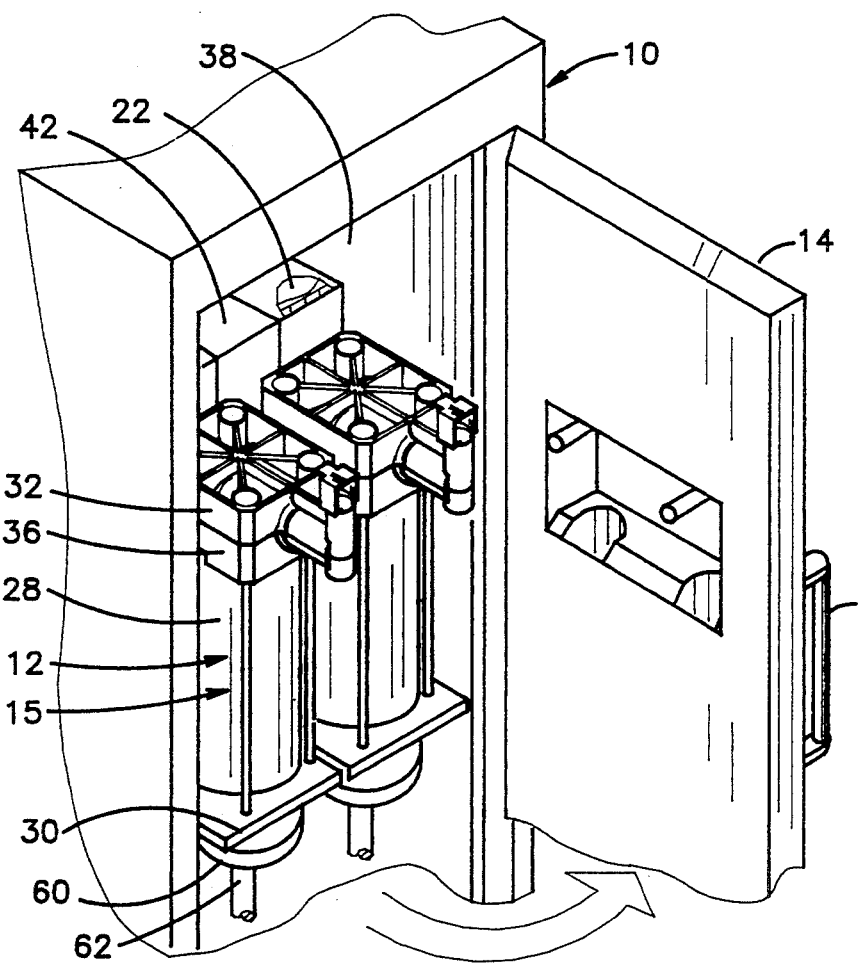
FIG. 2 is a partial interior view of the dispensing section and shows the receptacle for a collapsible container of the present invention.

FIG. 2 is a partial interior view of the dispensing apparatus 10. The container door 14 is open to reveal storage area 38, which contains multiple replacement collapsible containers 22 collected together into a transport package 42. The transport package 42 is generally constructed of a thermally insulated material.

Generally, frozen dessert or confection is bagged in a collapsible container 22, collected with other similar units in a transport package 42 and shipped in a hard frozen state at generally sub-zero degrees Fahrenheit. The transport package 42, containing the frozen confection, is placed in the storage area 38 where it is allowed to slowly thaw to the preselected dispensing temperature range. After the frozen confection has been tempered and the temperature has been brought to the preselected temperature, (or tempered) the temperature of the confection is maintained at this level to prevent localized melting and refreezing that could result in an unappetizing crystallization of the soft serve frozen confection.

Figure 3A:
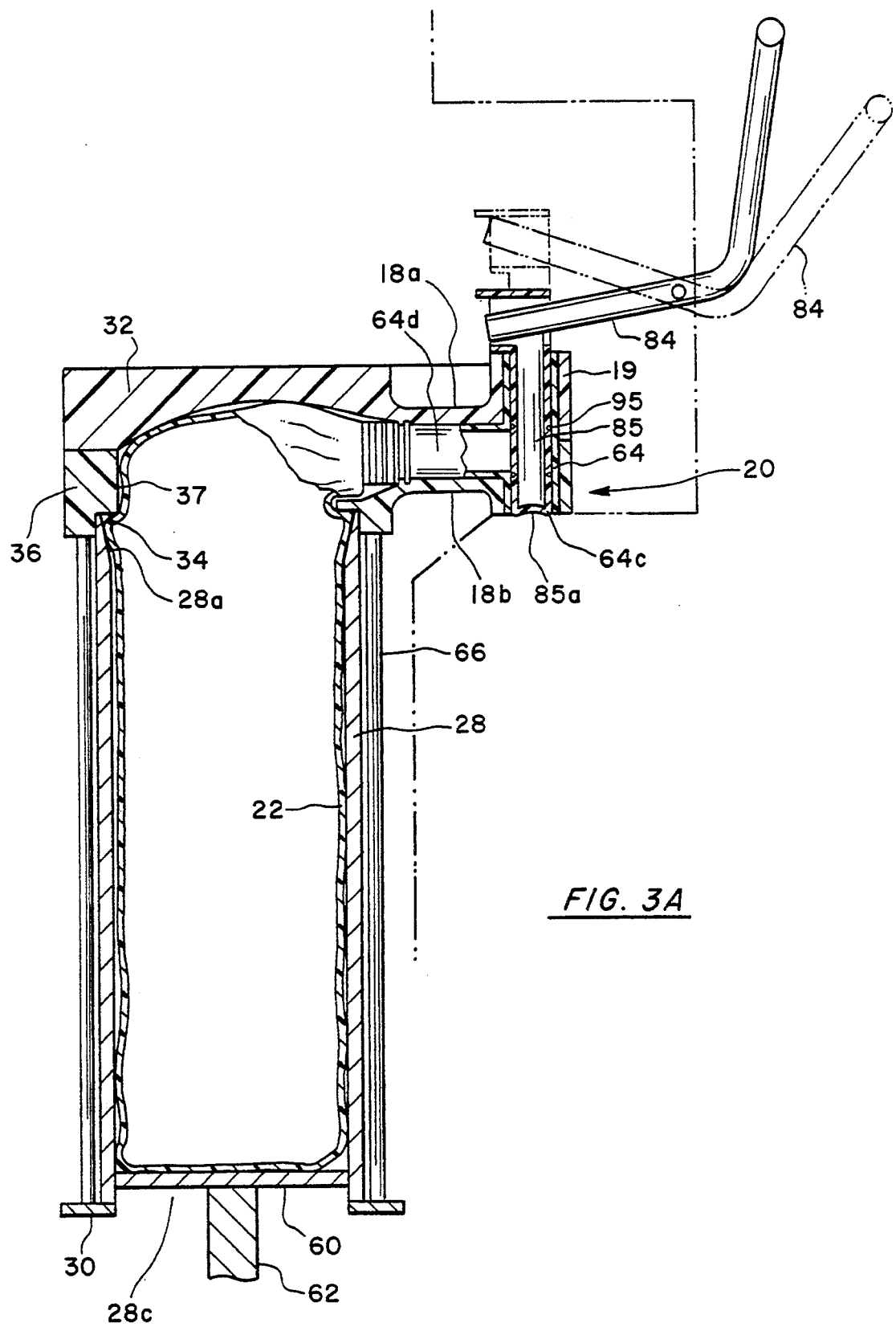
FIG. 3A is a partial cross-sectional view of a receptacle and collapsible container of the present invention shown in FIG. 3.
Figure 3:
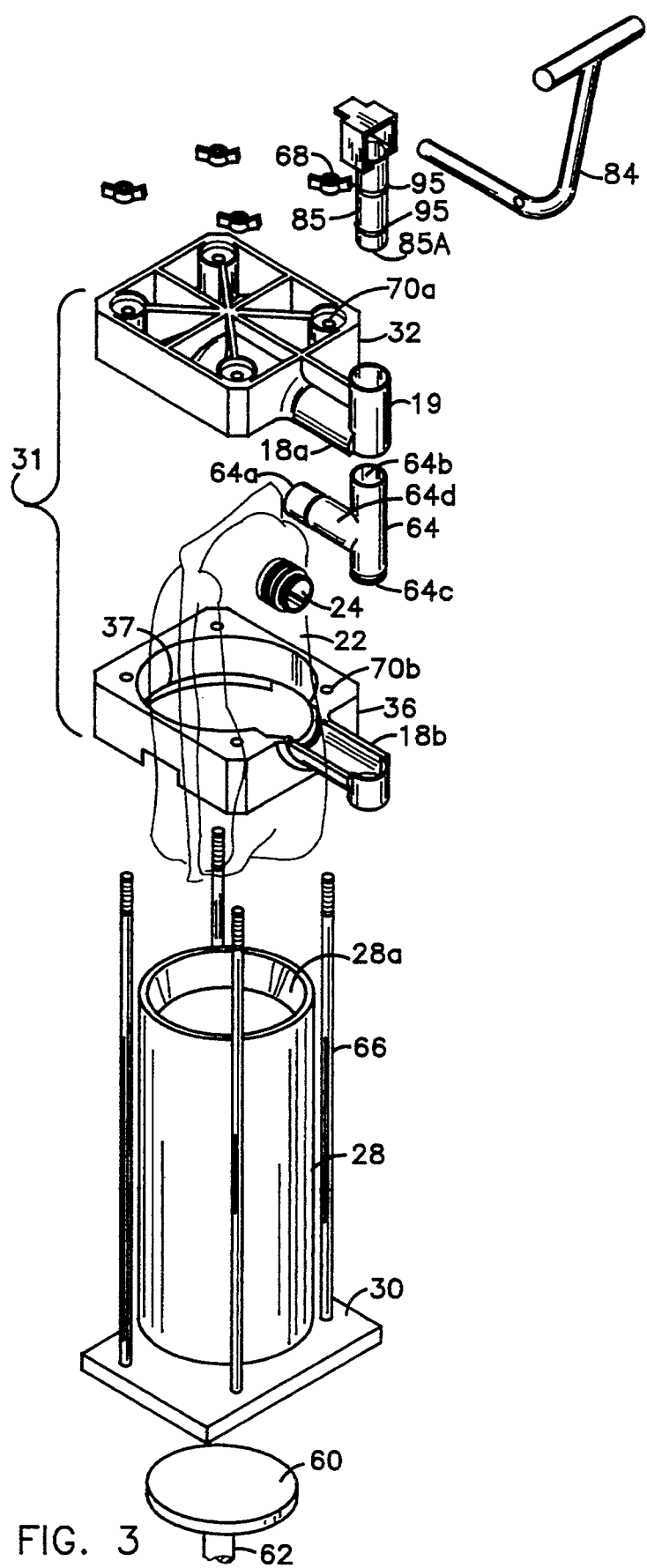
FIG. 3 is an exploded view of the collapsible container and receptacle for the collapsible container of the present invention.

The dispensing section 12 includes a plurality of dispensing assemblies 15, only two being shown. Each dispensing assembly 15 includes a receptacle 28 for receiving the collapsible container 22 (FIGS. 3, 3A, 4, 4A) therein. The receptacles 28 are elongated sleeves generally made of stainless steel, fiberglass or the like, with openings in each end thereof. As shown in FIG. 3, the top opening 28a is the opening to receive the collapsible container 22 therein. The bottom opening, or second opening 28c (FIG. 3A) receives the piston 60 therein as discussed hereinafter.

A receptacle support plate 30 is mounted to the interior of the dispensing section 12 for holding the receptacle 28 thereon. The receptacle support plate 30 has an opening therethrough of substantially the same diameter as the inside diameter of the receptacle 28 and the circumferential diameter of the piston 60 so as to receive the piston 60 therethrough.

Figure 4A:
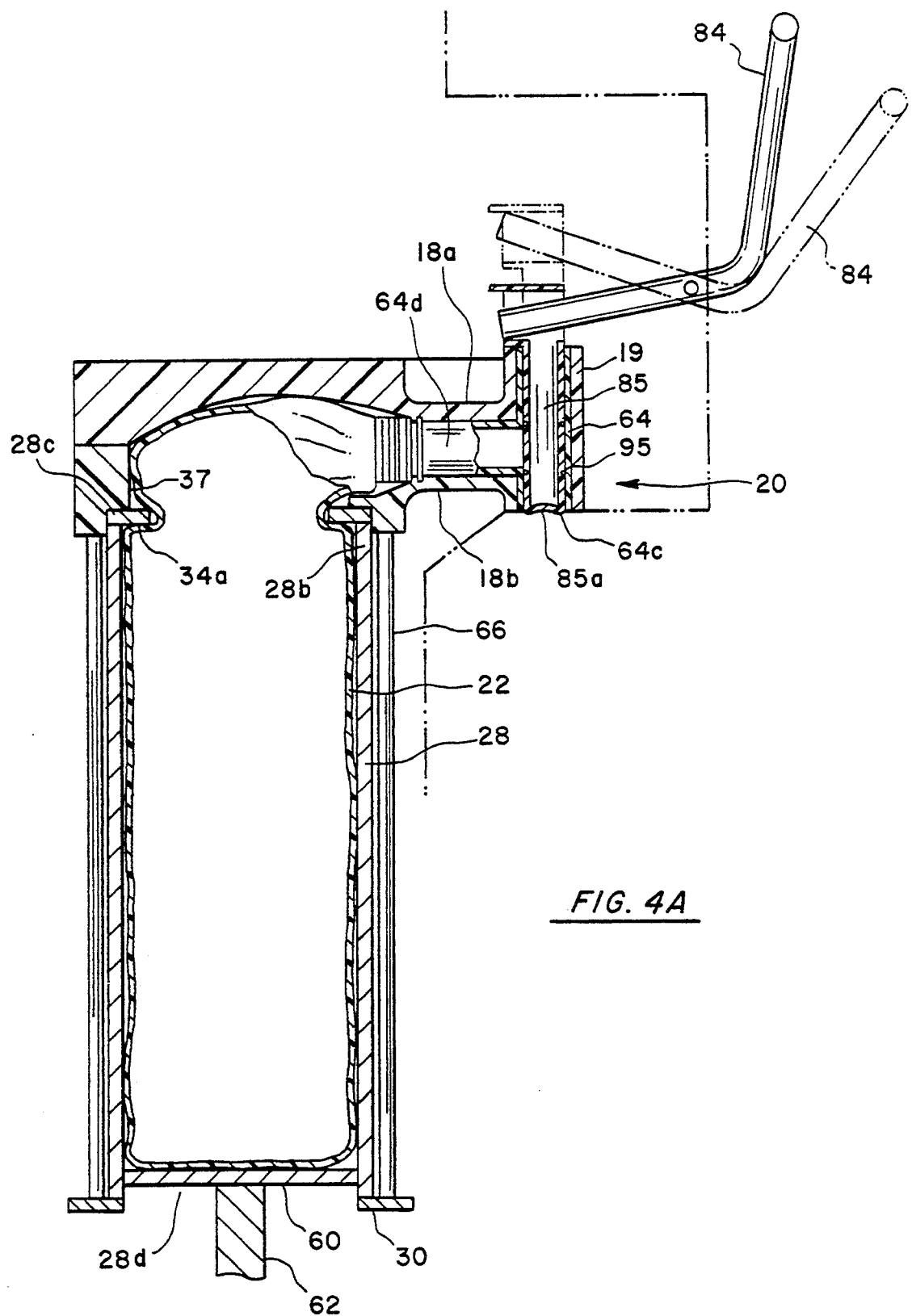
FIG. 4 is an exploded view of another preferred embodiment of the receptacle and collapsible container of the present invention; and, FIG. 4A is a partial cross-sectional view of the receptacle and collapsible container shown in FIG. 4.
Figure 4:
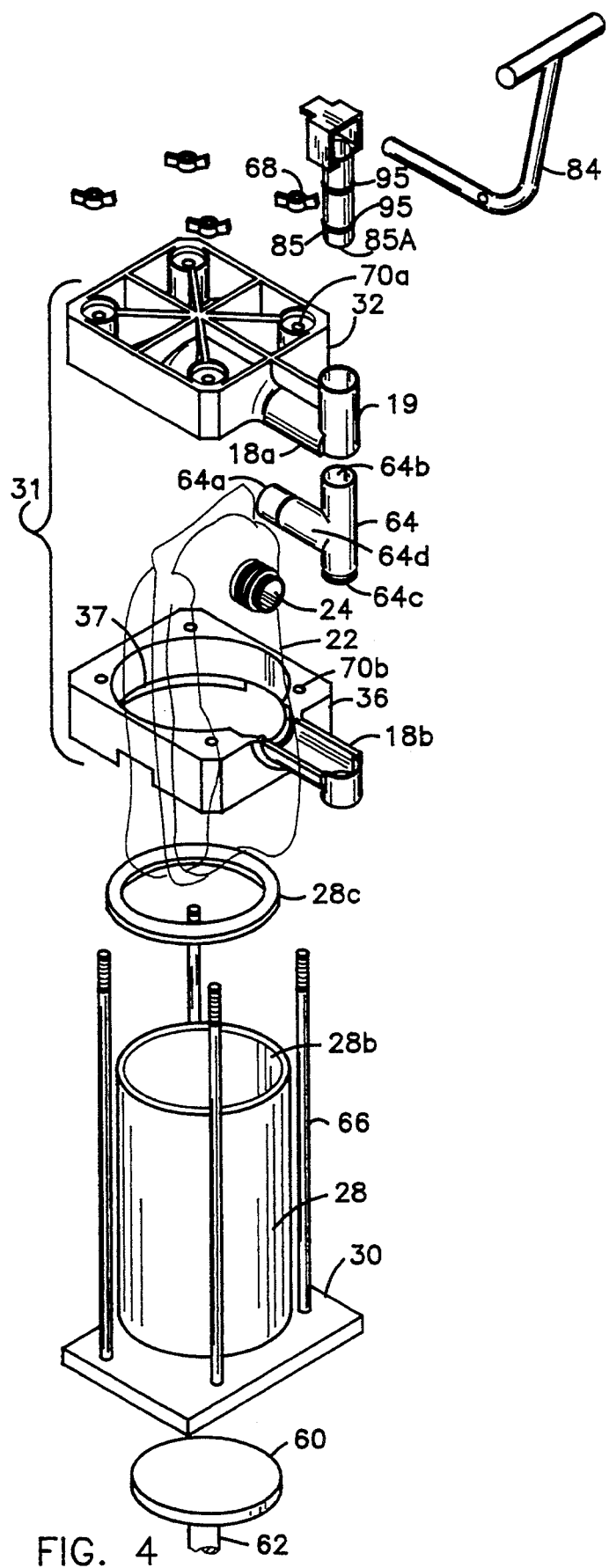

As best shown in FIGS. 3 and 4, the collapsible container 22 is held in place in the receptacle 28 during use by a pressure lid assembly 31. The pressure lid assembly 31 includes a pressure lid 32 and a pressure lid mount plate 36. The mount plate 36 is provided with a centrally disposed opening 37 therein that receives the discharge end of the collapsible container 22, the end including the collapsible container outlet 24. The pressure lid 32 in combination with the pressure lid mount plate 36 are provided with semi-circular outwardly extending conduit portions 18a and 18b, which together form a T-shaped dispensing conduit that receives the collapsible container outlet 24 therein. The T-shaped dispensing conduit 18a, 18b also receives the T-shaped spigot 64 therein. The T-shaped spigot 64 is provided with a cylindrical hollow inlet leg portion 64d that is disposed within the dispensing section 12. An opening 64a is in flow communication with the collapsible container outlet 24, preferably with the collapsible container outlet 24 being received within the inlet opening 64a in sealing relationship therewith.

The spigot 64 is also provided with a cylindrical hollow head portion in flow communication with and transverse to leg 64d. An opening 64b is disposed at one end of said head portion to receive a vertical action plunger 85 therein plunge 85 may be solid, but a preferred plunger 85 has a hollow core. The frozen confection or dessert that flows out of the collapsible container outlet 24 through leg portion 64d is blockable from the head portion of spigot 64 by the vertical action plunger 85. The manual lever 84 is attached to the plunger 85 whereby movement of lever 84 causes plunger 85 to be movable in and out of the spigot 64 to allow dispensing of the soft serve frozen confection. As shown in FIGS. 3A and 4A, the manual lever 84 can be raised (shown in dotted lines) above the leg portion 64d to allow dispensing of the frozen confection or lowered to a horizontal position (shown in solid line) below the leg portion 64d blocking flow of the confection through the spigot 64. In a preferred embodiment, the terminating end 85a of plunger 85 extends to and is horizontally aligned or flush with the terminating end (opening) 64c of spigot 64 so that in dispensing, all of the confection is forced from spigot 64. Moreover, "O" rings 95 are provided to circumscribe the outer surface of plunger 85 thereby sealing the plunger 85 from confectionary leakage therearound.

Generally, the handle 84 is in actuating relationship with piston 60 so that upon handle 84 being raised to a preselected point, the piston 60 is actuated and engages the bottom of the collapsible container 22, forcing the confection out of the collapsible container 22 through the collapsible container outlet 24. Upon lowering the handle 84, the piston 60 is disengaged and the movement of the piston upwardly for engaging with the collapsible container 22 is therefore stopped and the plunger 85 blocks the flow of the soft serve confection through the spigot 64. In a preferred embodiment piston 60 is operable in response to a variable pressure source so that as the lever 84 is raised higher, additional pressure is applied to the collapsible container 22 through piston 60.

The pressure lid mount plate 36 and the pressure lid 32 are mounted onto the receptacle 28 for the collapsible container 22 by a plurality of elongated threaded members 66 and accompanying wing nuts 68. The pressure lid 32 and the pressure mount plate 36 are provided with a plurality of apertures therethrough identified as 70a and 70b, respectively. Each elongated threaded rod member 66 is passed through aligned apertures 78a and 78b and a wing nut 68 is screwed onto the threaded rod member 66 and tightened down, thereby holding the pressure lid 32 and the mount plate 36 onto the receptacle 28.

As shown in FIGS. 3 and 3A, at the top opening 28a of the receptacle 28, the opening is tapered so that at the outer extremity of the opening 28a, the diameter is greater than the diameter of the opening 37 thereby defining a groove 34 at the juncture of the mount plate 36 and the receptacle 28. This groove 34 prevents the upward movement of the collapsible container 22 when the piston 60 is actuated to force confection out of the outlet 24 and collapse the container 22. The collapsible container 22 tends to gather at the groove 34 and thereby does not collapse into the outlet 24, which would interfere with or block the flow of soft serve confection from the collapsible container 22.

FIGS. 4 and 4A show an alternative means for the prevention of the collapsing of the collapsible container 22 into the outlet 24 when in use. In this embodiment the receptacle opening 28b is not tapered but is straight or of substantially the same diameter as the opening 37 in the mount plate 36. Moreover, a metallic or relatively hard plastic O-ring 28c having an inside diameter less than the diameter of the opening 28b is placed on the receptacle between the receptacle 28 and the mount plate 36. A recess 34a is thereby formed between the opening 28b and the O-ring 28c to prevent the movement of the collapsible container 22 therepast when the confection is being dispensed therefrom.

In the removal of a collapsible container 22, wing nuts 68 are removed from the elongated threaded rod members 66 and the pressure lid 32 is separated from the pressure lid mount plate 36, thereby disengaging the pressure lid 32 from the spigot 64. The spigot 64 is then disengaged from the collapsible container outlet 24 and the pressure lid mount plate 36 is lifted away from the receptacle 28, thereby leaving the collapsible container 22 to be removed from the receptacle 28. The T-shaped spigot 64 and plunger 85 are then cleaned and replaced in the pressure lid plate 36 as the spigot 64 and plunger 85 are the only parts that come in contact with the flowing frozen confection. And, in many cases, since the T-shaped spigot 64 and plunger 85 are relatively inexpensive plastic pieces, the spigot 64 and plunger 85 may be discarded and new ones inserted.

In the insertion of a full collapsible container 22 into use, the full collapsible container 22 is placed or dropped into the receptacle 28 and the pressure lid mount plate 36 is placed onto the receptacle 28 with the elongated threaded rod members 66 passing up through the appropriate apertures 70b. Once the pressure lid mount plate 36 is secured upon the receptacle 28, the spigot 64 is placed upon the semi-circular conduit 18b and the collapsible outlet 24 is inserted within the opening 64a. Apertures 70a are then aligned with the elongated threaded rod members 66 and the pressure lid 32 is then placed over and onto the pressure lid mount plate 36 with the semi-circular conduit portion 18a receiving the spigot 64 therein with the end opening 64b being inserted into the tubular portion 19 of the semi-circular conduit portion 18a. Wing nuts 68 are then threaded upon the threaded rod members 66 and tightened down to secure the bag in place.

Although the invention has been described in detail with reference to specific preferred embodiments, various modifications exist within the scope and spirit of the present invention and it is not intended that the aforementioned discussion in any way limits the scope of the present invention as set forth in the following claims appended hereto.

What is claimed is:

1. An apparatus for dispensing frozen dessert under action of a piston comprising:
    a housing having an interior formed therein;
    a collapsible cylindrical container containing said frozen dessert;
    said collapsible container having an outlet of sufficient size to allow extrusion of said frozen dessert therefrom;
    a cylindrical receptacle disposed within said formed interior of said housing for receiving said collapsible cylindrical container, said receptacle having a first opening at one end, said first opening sized to receive said collapsible container therein, said cylindrical receptacle including a formed groove, said formed groove being tapered towards said first opening and having a diameter greater than a diameter of said first opening, said formed groove preventing said collapsible container from collapsing into said outlet during use, said groove formed circumferentially around said receptacle adjacent said first opening for gathering the sides of said collapsible container thereby preventing movement of said sides of said collapsible container into said outlet so as to prevent interfering and blocking of said frozen dessert through said outlet during said extrusion.

2. An apparatus for dispensing frozen dessert under action of a piston comprising:
    a housing having an interior formed therein;
    a collapsible cylindrical container containing said frozen dessert;
    said collapsible container having an outlet of sufficient size to allow extrusion of said frozen dessert therefrom;
    an O-ring;
    a cylindrical receptacle disposed within said formed interior of said housing for receiving said collapsible cylindrical container, said receptacle having a first opening at one end, said first opening sized to receive said collapsible container therein, said cylindrical receptacle including a pressure lid assembly for receiving an end of the collapsible container, said O-ring having an interior diameter of sufficient size to receive the end of the collapsible container therein, said receptacle having said first opening with a greater diameter than said pressure lid assembly interior diameter, said O-ring located to form a recess between a juncture of said pressure lid assembly interior and said first opening of said receptacle for gathering sides of said collapsible container at said recess thereby preventing movement of said sides of said collapsible container into said outlet.

* * * * *